(12) United States Patent
Worthington et al.

(10) Patent No.: US 6,667,473 B1
(45) Date of Patent: Dec. 23, 2003

(54) TABLET MONITORING SYSTEM

(75) Inventors: James Worthington, Binghamton, NY (US); James Boyer, Johnson City, NY (US); Joseph H. Boyer, Johnson City, NY (US)

(73) Assignee: Innovation Associates, Inc., Johnson City, NY (US)

( * ) Notice: Subject to any disclaimer, the term of this patent is extended or adjusted under 35 U.S.C. 154(b) by 30 days.

(21) Appl. No.: 10/105,608

(22) Filed: Mar. 26, 2002

(51) Int. Cl.[7] .............................. G01V 8/00; G01J 1/32
(52) U.S. Cl. ................ 250/222.2; 250/205; 250/214 C; 235/98 C; 359/509; 377/6
(58) Field of Search .............................. 250/221, 222.1, 250/214 C, 222.2, 205; 221/211; 235/98 C; 359/507, 509; 377/6

(56) References Cited

U.S. PATENT DOCUMENTS 3,928,753 A * 12/1975 Kivett et al. ................ 377/6

* cited by examiner

Primary Examiner—Stephone B. Allen
(74) Attorney, Agent, or Firm—Salzman & Levy

(57) ABSTRACT

A monitoring system for adjusting a light source for a counting cell signal in a counting and dispensing system, which light deteriorates over time as a result of dust accumulation from the handling of pills, capsules, and tablets. The monitoring system uses electronics to adjust the light relative to the dust accumulation, thus maintaining an accurate counting cell signal, so that the system can continue to function. In this respect, the monitoring system provides for longer intervals between required maintenance operations, and therefore reduces the cost of operation.

11 Claims, 7 Drawing Sheets

TABLET MONITORING SYSTEM

FIELD OF THE INVENTION

This invention relates to pill, capsule, and tablet counting and dispensing systems and, more particularly, to a monitoring scheme for detecting, and partially compensating for, contamination from pill, capsule, and tablet dust in an automated counting and dispensing system.

BACKGROUND OF THE INVENTION

In automated pharmaceutical counting and dispensing systems, such as that shown in U.S. Pat. No. 5,907,493, dust from pills, capsules, and tablets forms during their handling and processing. The dust accumulates over time and may eventually affect the accuracy of the pharmaceutical count by coating the light source and/or photo-detectors of the counting cell. One method of preventing the dust from becoming a serious problem is to schedule regular maintenance and cleaning of the counting cell of the automated system. However, this may result in unnecessary maintenance costs. It is also time inefficient to clean the equipment frequently.

The present invention describes a system and method whereby the counting cell is part of a self-monitoring system wherein signals from the counting cell can be adjusted automatically for dust accumulation, and to a certain extent, accommodate this buildup. The monitoring system also has the capability to periodically warn operators when the dust buildup becomes too great to be accommodated by the counting cell, thus requiring that the cell be cleaned and serviced.

SUMMARY OF THE INVENTION

In accordance with the present invention, a method and system is illustrated and described, in which dust accumulation from a pill, capsule, and tablet counting process is monitored and adjusted. In automated pharmaceutical counting and dispensing systems, dust abrades from pills, capsules, and tablets during their handling and processing. The dust builds up over time and can eventually affect the accuracy of the pharmaceutical count by coating the light source and/or photo-detectors of the counting cell. The signal base line from the counting cell decreases due to the dust accumulation, as does the magnitude of its signal. Electronics are used to adjust to the deterioration of the counting cell signal and base line reading, so that the system can continue to function with accuracy. In this respect, the monitoring system provides for longer intervals between required maintenance operations, therefore reducing the cost of operation. Eventually, however, the counting cell will require maintenance; the monitoring system then provides a warning to the system operator.

It is an object of the present invention to provide an improved monitoring system for an automated pill, capsule, and tablet counting and dispensing system.

It is another object of the invention to provide a monitoring system for an automated pill, capsule, and tablet counting and dispensing system that increases the interval between required maintenance operations, and therefore reduces the cost of operation.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like components and elements of the apparatus of this invention will bear the same designations or numbering throughout the figures.

DESCRIPTION OF THE PREFERRED EMBODIMENT

Generally speaking, the invention features a monitoring system for adjusting a light source for a counting cell signal in a counting and dispensing system, which light deteriorates over time as a result of dust accumulation from the handling of pills, capsules, and tablets. The monitoring system uses electronics to adjust the light relative to the dust accumulation, thus maintaining an accurate counting cell signal so that the system can continue to function. In this respect, the monitoring system provides for longer intervals between required maintenance operations, reducing the cost of operation. Eventually, however, the counting cell may require maintenance. The monitoring system will provide a warning to the system operator.

Figure 1:
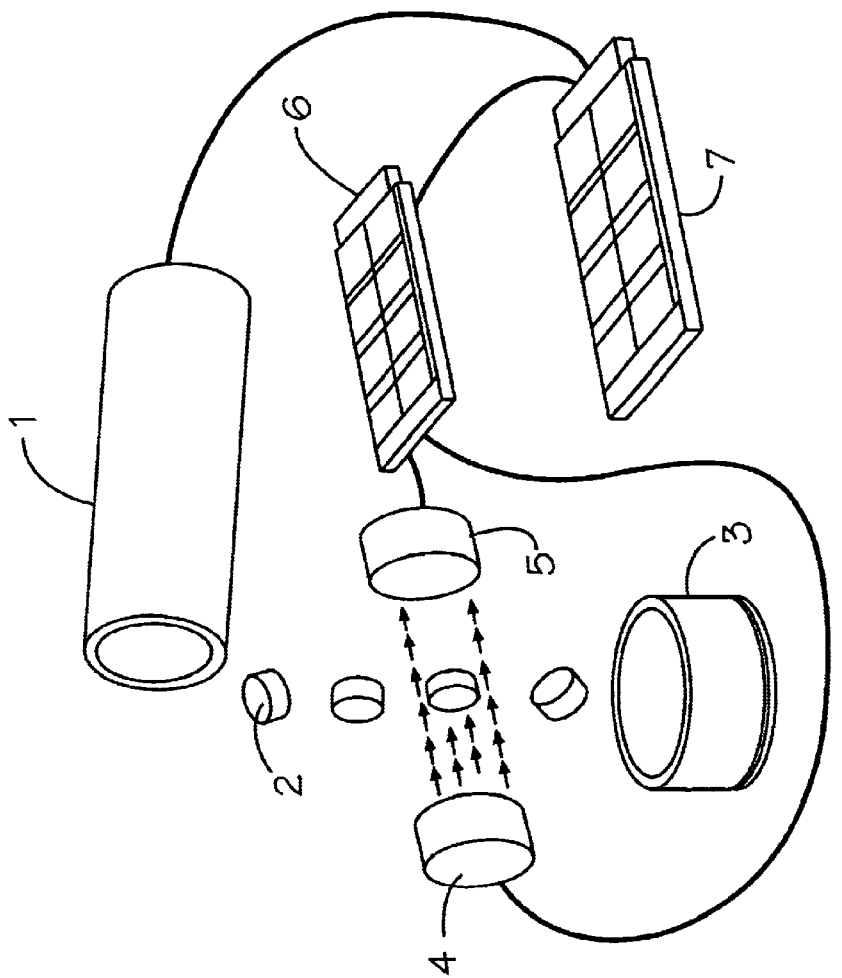
FIG. 1 illustrates an exploded, perspective view of a counting cell and its associated electronics for counting the number of pills, capsules, and tablets being dispensed in an automated pharmaceutical system.

Now referring to FIG. 1, within a tablet counting cell, a pill/tablet/capsule delivery device 1 produces a stream of pills, tablets, or capsules 2. Tablets 2 falling off the end of the delivery device 1 pass between light source 4 and photo-detector 5. The tablets 2 then proceed into a holding receptacle 3. The amount of light registered by photo-detector 5 is converted into an electric voltage and sent to an electronic circuit 6. As a tablet 2 falls through, the light registered by photo-detector 5 drops momentarily. The magnitude of the drop in light intensity is measured by the electronic circuit 6. A sufficient light intensity drop indicates the passage of a tablet.

Over time, however, dust (not shown) composed of abraded matter from the tablets 2 will accumulate on light source 4 and/or photo-detector 5. As the dust accumulates the overall magnitude of the light reaching photo-detector 5 declines. This condition gradually leads to a higher probability of counting errors.

It will be recognized that the functions of control computer 7 may be provided by a card-mounted microprocessor as schematically illustrated in FIG. 1. Other physical form factors, of course, could also be used. The processing functions described in detail hereinbelow may be performed by such a single, card-mounted processor. Alternatively, some or all of the processing functions may be performed by one or more external processors, for example a pharmacy management computer (not shown) to which the counting unit of the invention could be connected. In still other embodiments, control functions for a plurality of counting units could be performed by a single control computer 7.

Figure 2A:
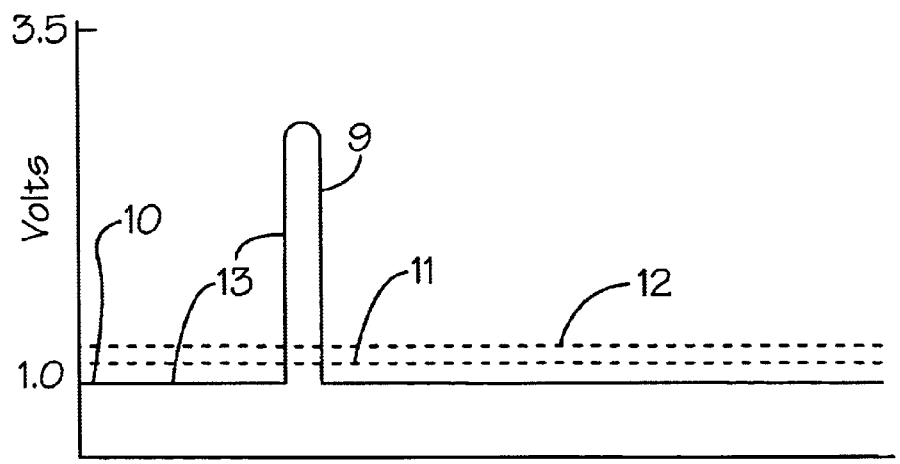
FIGS. 2a through 2c depict graphs of the voltage signal from the counting cell of the pharmaceutical counting and dispensing system versus time.

Referring to FIG. 2a, a graph is shown of the voltage representing the light level detected by photo-detector 5 plotted against time. In this graph, higher voltages represent less light. Baseline voltage level 10 represents the photo-detector circuit output when no tablet is present. Pulse 9 caused by the darkening that occurs due to the passage of a tablet 2, is superimposed on baseline voltage level 10. Together, pulse 9 and baseline voltage level 10, form photo-detector output 13.

Voltage level 11 is a floating level, which electronic circuit 6 keeps at 40 millivolts above the baseline voltage level 10. Voltage level 11 is associated with the minimum pulse height (above baseline voltage level 10), which reliably indicates the presence of a tablet 2. The electronic circuit 6 generates a signal to a control computer 7 (FIG. 1), indicating that a tablet 2 has passed through, when pulse 9 reaches voltage level 11. Conversely, if the top of pulse 9 fails to reach voltage level 11, electronic circuit 6 does not count a tablet.

Electronic circuit 6 also establishes a voltage level 12, which also floats above baseline voltage level 10 by 60 millivolts, in the preferred embodiment, and acts as a warning level indicating the need for maintenance to remove dust.

As dust accumulates on light source 4 and/or photo-detector 5, three conditions would tend to occur if no action were taken. The first condition is that baseline voltage level 10 of signal 13 would move toward 3.5 volts. This is the level at which no light reaches photo-detector 5. The second condition is that the peak-to-peak amplitude of pulse 9 would be reduced. The third condition is that the width of pulse 9 would be reduced.

However, electronic circuit 6 takes action to prevent baseline voltage level 10 from moving upward as dust accumulates. Baseline voltage level 10 is maintained at 1.0 volt. Circuit 6 accomplishes this function by gradually increasing the light emitted by light source 4 through the use of an automatic level control circuit. As a result, the waveform levels illustrated in FIG. 2a are maintained for as long as possible.

Figure 2B:
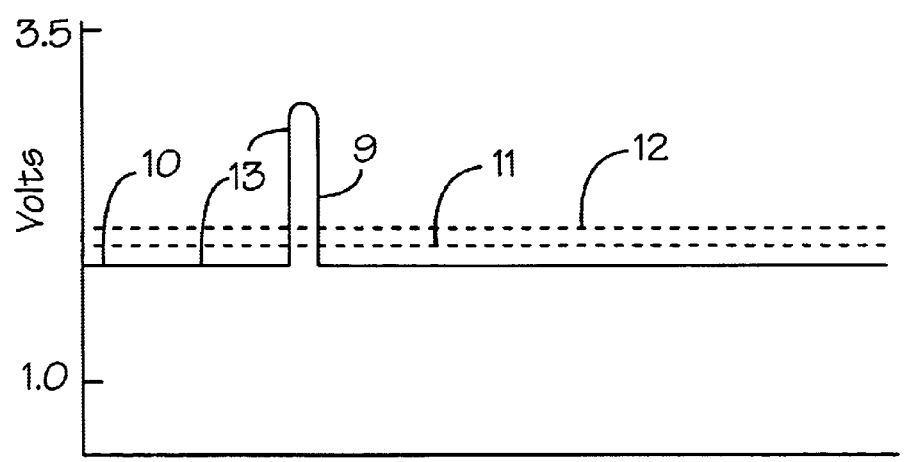

However, after further accumulation of dust, a point will be reached where not enough light impinges photo-detector 5 for the automatic level control to maintain baseline voltage level 10 at 1.0 volt. As shown in FIG. 2b, baseline voltage level 10 then moves upward, taking with it the base of pulse 9 and also voltage levels 11 and 12, which float above baseline voltage level 10. At the same time, the peak-to-peak amplitude of pulse 9 and its width decrease.

Figure 2C:
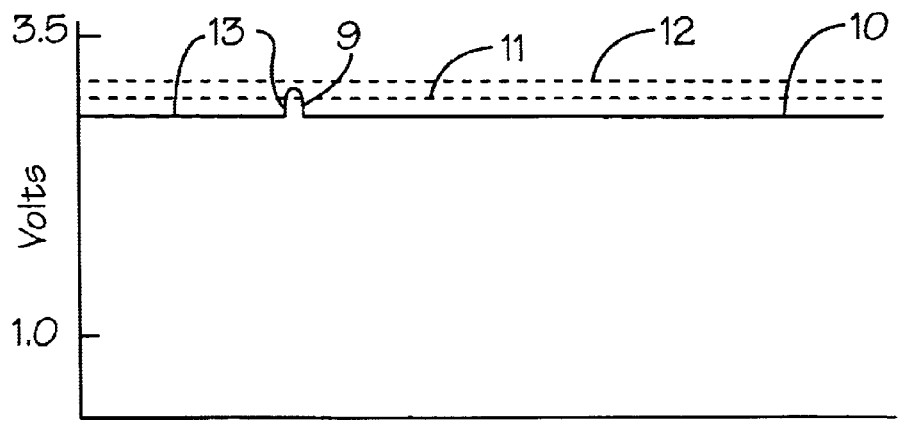

Eventually the conditions of FIG. 2c will be reached. Baseline voltage level 10 approaches the full darkness level of 3.5 volts. The width and height of pulse 9 shrink even further. Pulse 9 still exceeds voltage level 11, so that tablet detection is still possible. However, pulse 9 now does not reach voltage level 12. This fact is signaled to control computer 7 (FIG. 1), and indicates an error. The width of pulse 9 at voltage level 11, and the width of pulse 9 at voltage level 12 are measured and compared. If the width at voltage level 12 is shorter than the width at voltage level 11, a warning signal that cleaning maintenance is needed is sent to control computer 7.

Depending on the size and shape of the tablets 2 and the angles at which they randomly fall through the counting detector, however, not every tablet 2 may result in pulse 9 falling below voltage level 12. Therefore, control computer 7 keeps track of how many times per 100 tablets, pulse 9 fails to meet voltage level 12. Software in control computer 7 can then make a determination that failure to attain voltage level 12 has occurred too many times, and call for the entire counting cell to be taken off line and cleaned.

All of the foregoing activities occur before dust accumulates to the point where pulse 9 fails to reach voltage level 11, the point at which a tablet 2 would be missed. This lower threshold safety feature ensures that no cell will become dust-covered to the extent that inaccurate counting takes place.

Figure 3:
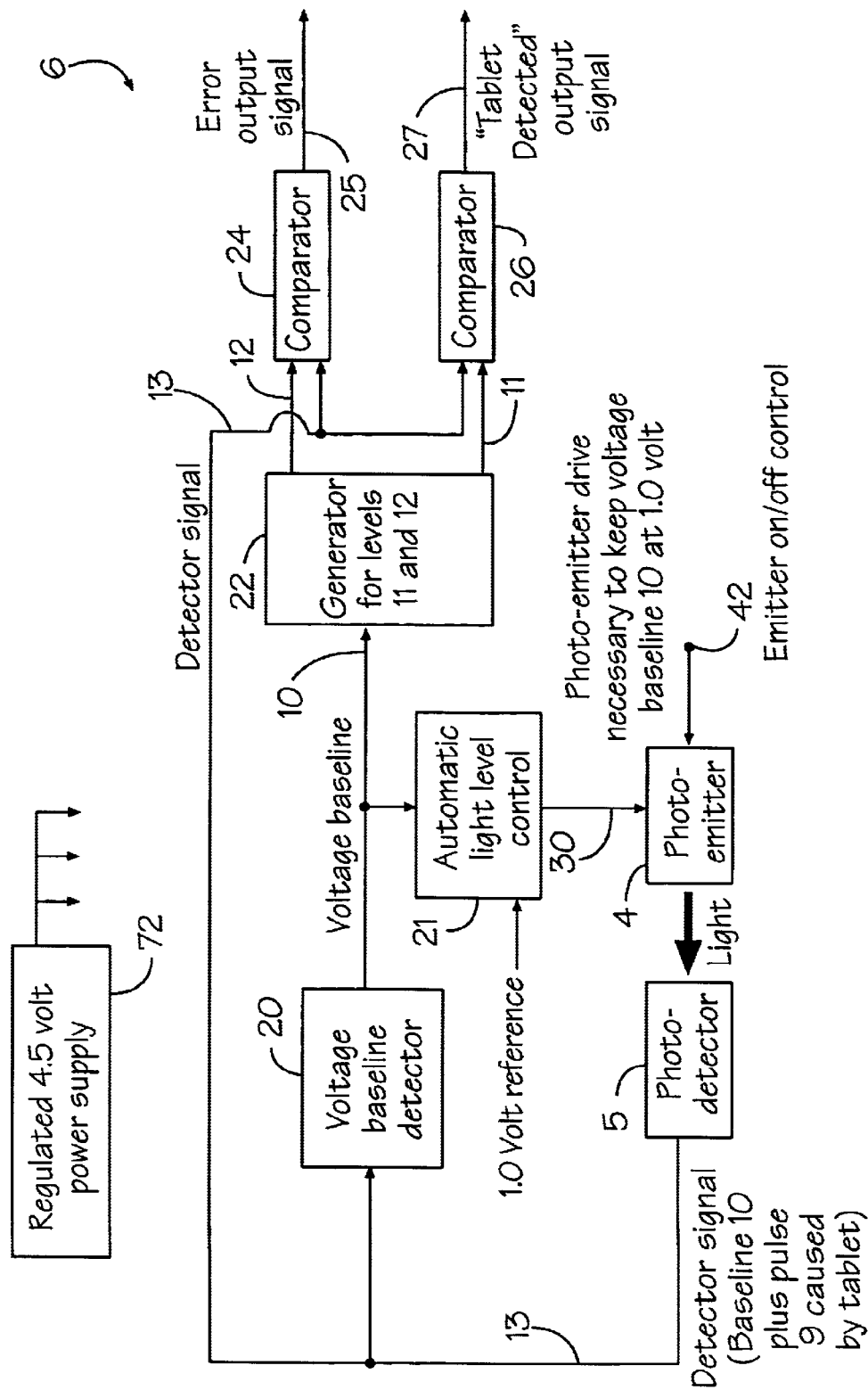
FIG. 3 shows a block diagram of the monitoring circuitry of this invention.

Referring to FIG. 3, a block diagram of electronic circuit 6 is illustrated. Light source 4 comprises a semiconductor infrared photo-emitter that passes light through the tablet stream to photo-detector 5, which comprises an array of phototransistors. As a tablet 2 passes through the light beam, photo-detector 5 produces signal 13, which comprises pulse 9 superimposed on the baseline voltage level 10.

Voltage baseline detector 20 determines the baseline voltage level 10 by detecting the most negative level of signal 13, which effectively removes pulse 9, thus leaving baseline voltage level 10. Baseline voltage level 10 is then presented to automatic light level control 21, which compares it with a fixed level of 1.0 volt. Should the baseline voltage level 10 rise above 1.0 volts (indicating a loss of light), automatic light level control 21 increases the drive 30 to the photo-emitter in light source 4, causing more light to impinge photo-detector 5, which causes baseline voltage level 10 to drop back towards 1.0 volts.

Generator circuit 22 accepts voltage baseline level 10, and utilizes it to generate voltage levels 11 and 12. Voltage level 11 is thus baseline voltage level 10, plus 40 millivolts; voltage level 12 baseline voltage level 10 plus 60 millivolts. In order to cause control computer 7 to turn light source 4 on or off, input 42 is provided to light source 4.

Voltage level 11 is passed to a comparator 26, which compares it to the peak of pulse 9 contained within signal 13. Should pulse 9 be greater than voltage level 11, comparator 26 produces a "tablet detected" signal 27, which is sent to control computer 7. Voltage level 12 is passed to another comparator 24, which compares it to the peak of pulse 9 contained within signal 13. Should pulse 9 be less than level 12, comparator 24 produces an error signal 25, which is sent to the control computer 7.

Figure 4:
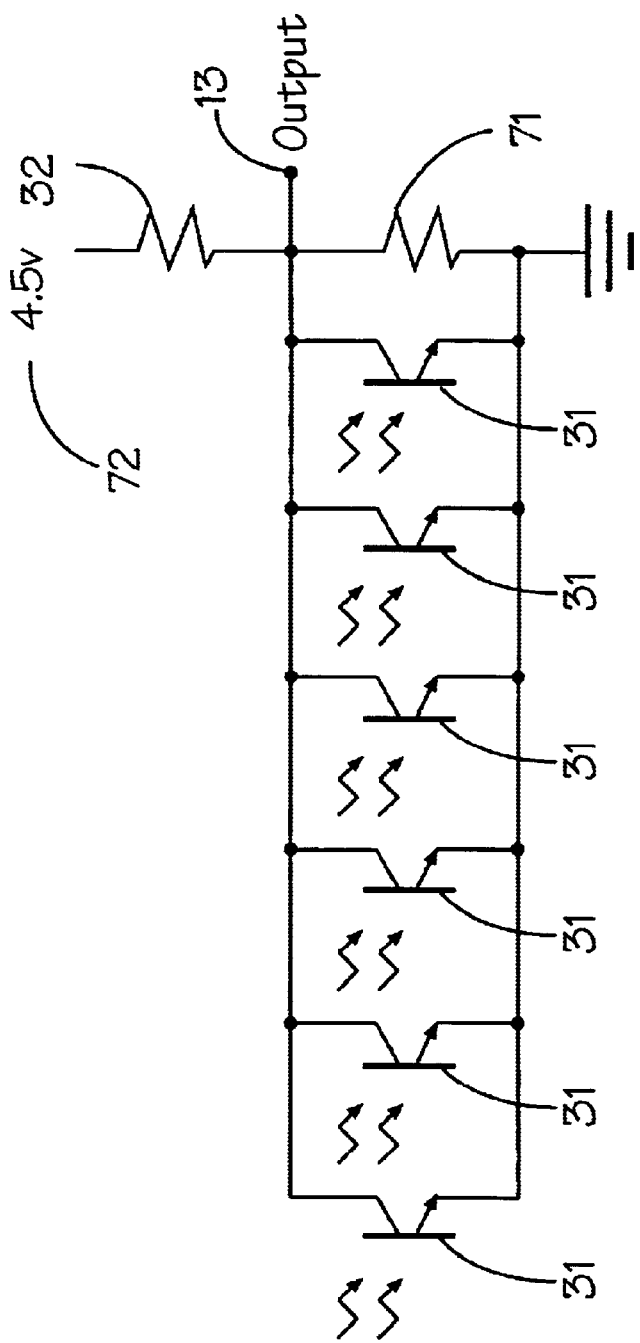
FIG. 4 illustrates a circuit diagram for the photo-detector shown in the circuitry of FIG. 3.

Referring to FIG. 4, a circuit for photo-detector 5 is illustrated. This circuit comprises six phototransistors 31, each of which is sensitive to infrared light, and connected together between resistor 32 and resistor 71. Resistors 32 and 71, in conjunction with regulated 4.5-volt power supply 72, form a network, which establishes a ceiling voltage of 3.5 volts for the photo-detector output signal 13. As more light strikes phototransistors 31, more current flows through resistor 32, and detector output 13 falls. As a tablet 2 falls through the detector, less light strikes phototransistors 31, resulting in less current passing through them, and producing a rise in the voltage at output 13 approaching the 3.5 volt ceiling.

Figure 5:
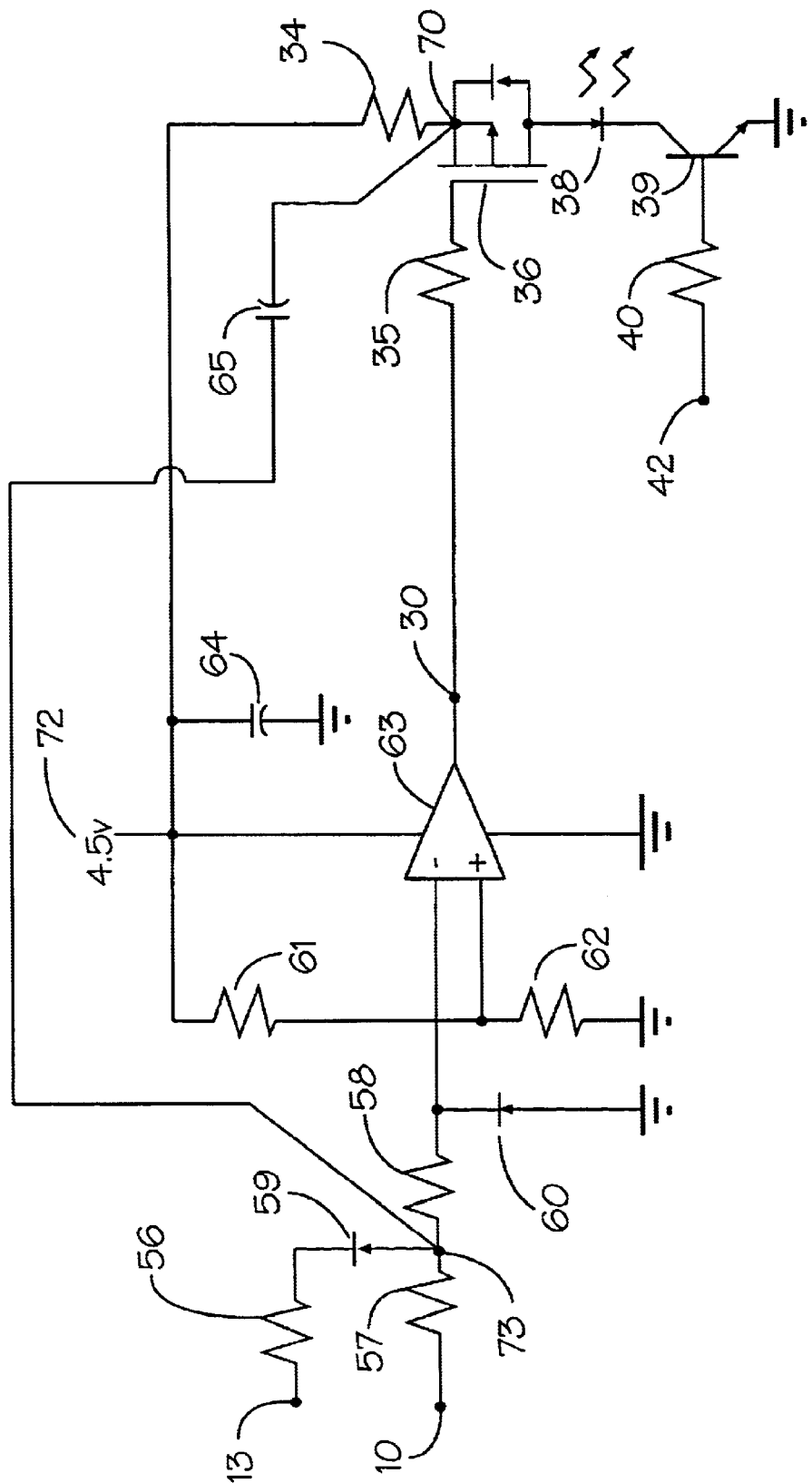
FIG. 5 depicts a light level circuit diagram.

Referring to FIG. 5, circuits for automatic light level control 21 and light source 4 are shown. Baseline voltage level 10 is presented to a summing junction 73 through a resistor 57. Summing junction 73 is connected to the negative input of an operational amplifier 63 through a network comprising a resistor 58 and diode 60, which together prevent the negative input to operational amplifier 63 from becoming more negative than ground. This prevents a latch up condition. Summing junction 73 is connected through a capacitor 65 to the source 70 of a field effect transistor 36, forming an integrator with a time constant controlled by resistor 57 and capacitor 65. This time constant is active during normal operation.

Detector output signal 13 enters summing junction 73 through a resistor 56 and diode 59. This connection is provided in order to rapidly stabilize the automatic level control circuit upon startup, at which time, the time constant is controlled by resistor 56 and capacitor 65. The circuit of resistor 56 becomes ineffective due to diode 59, as soon as detector output 13 rises above 0.6 volts, at which time normal operation has been achieved.

Resistors 61 and 62, between regulated supply voltage 72 and ground, establish a reference voltage of 1.0 volt, and present this to the positive input of operational amplifier 63. The output of operational amplifier 63, which is the output 30 of automatic light level control 21, is presented to the main light control field effect transistor 36, through resistor 35. Field effect transistor 36 controls current passing through load resistor 34, infrared photo-emitter 38, and transistor 39, and therefore controls the amount of infrared light produced. Transistor 39 controls whether the photo-emitter 38 is on or off by the action of a computer signal 42 passing through a resistor 40.

As a result of these actions, operational amplifier 63 produces a drive signal 30 to light source 4 in order to increase the light sensed by photo-detector 5, which maintains the baseline voltage level 10 at 1.0 volts for as long as possible during dust buildup. When the dust reaches too high a level, the added light will no longer be able to hold voltage baseline level 10 at 1.0 volt. The higher baseline voltage level 10 then approaches the ceiling voltage of 3.5 volts. Pulse 9 is then compressed in height, and voltage level 12 floats upwardly, eventually causing the top of pulse 9 to drop below voltage level 12. This triggers the sending of an error signal 25 to control computer 7.

Figure 6:
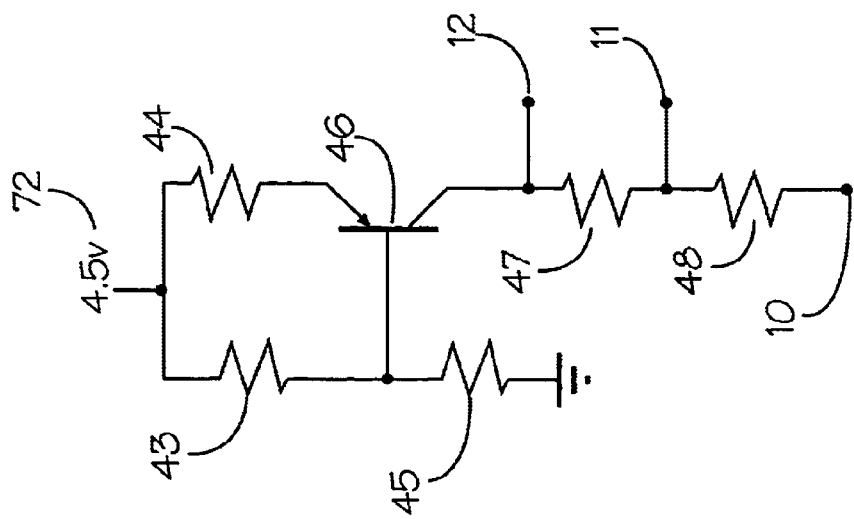
FIG. 6 shows a circuit diagram for a voltage level generator.

Referring to FIG. 6, a circuit for generator 22 is shown, which produces voltage levels 11 and 12. Resistors 43, 44, and 45, in conjunction with transistor 46, comprise a constant current generator, which produces a fixed current of 10 microamperes. This 10 ·a current passes through a resistor divider circuit consisting of resistors 47 and 48, which in turn is referenced to baseline voltage level 10. As a result, output voltage level 11, which appears at the junction of resistors 47 and 48, floats 40 millivolts above baseline voltage level 10, while output voltage level 12, which appears at the junction of resistor 47 and transistor 46, floats 60 millivolts above baseline voltage level 10.

Figure 7:
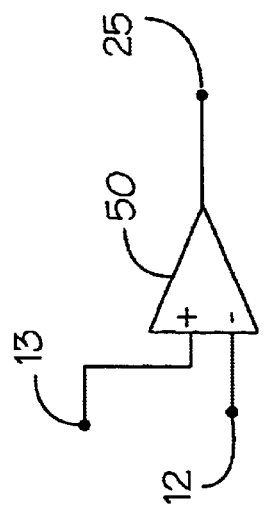
FIG. 7 illustrates a comparator circuit diagram.

Referring to FIG. 7, a comparator circuit 24 is illustrated, which compares the height of pulse 9, contained within detector signal 13, with voltage level 12. Should the peak of pulse 9 drop below voltage level 12, this circuit 24 produces an error signal 25, indicating that dust accumulation is now approaching a critical limit. Signal 25 is sent to control computer 7. Actually, if dust accumulation is significantly great, voltage pulse 9 fails to reach voltage level 12 (i.e., 60 mv above baseline). Consequently, no pulse is produced at signal 25. This absence of signal coincides with an actual pulse at signal 27, hereinbelow described.

Figure 8:
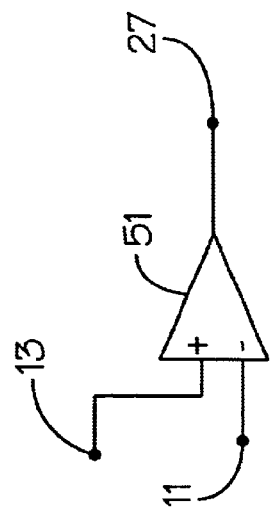
FIG. 8 depicts another comparator circuit diagram.

Referring to FIG. 8, a comparator circuit 26 compares the height of pulse 9 contained within detector signal 13 with that of voltage level 11. Should the peak of pulse 9 rise above voltage level 11, this circuit 26 produces a signal 27 that indicates that a tablet 2 is to be counted. Signal 27 is sent to control computer 7. Comparator circuit 26 produces a pulse at signal 27 when pulse 9 is higher than voltage level 11 (i.e., 40 mv above baseline). The pulse at signal 27 occurs at the point when a pulse at signal 25 would have occurred, had there been one. The absence of the pulse at signal 25 is noted by control computer 7, which receives the pulse at signal 27. In other words, if no pulse is received at signal 25, control computer 7 detects the absence thereof and interprets it as an error signal indicating that dust accumulation is approaching the critical limit. If the pulse at signal 27 never reaches voltage level 11, however, then control computer 7 remains unaware of that status. Since dust accumulates gradually, the system will eventually detect a pulse at signal 27, but no pulse at signal 25. As aforementioned, a comparison is also made of the widths of the pulses at signals 25 and 27, and a separate warning can be issued.

Figure 9:
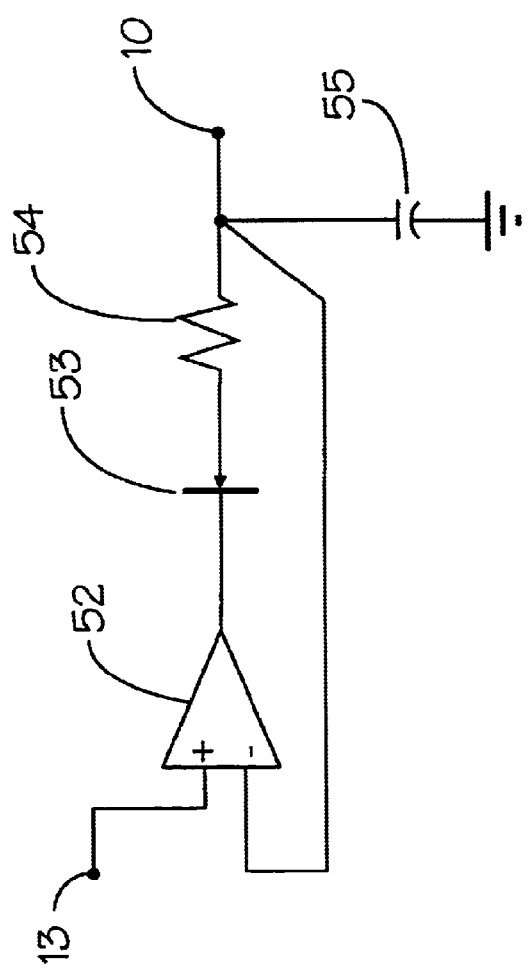
FIG. 9 shows a circuit diagram for base line detection.

Referring to FIG. 9, a circuit for voltage baseline detector 20 is illustrated. Photo-detector output signal 13 is fed into the positive input of operational amplifier 52. A negative peak detector is formed with operational amplifier 52, diode 53, resistor 54, and capacitor 55. Feedback is applied from output (baseline voltage level) 10 back to the negative input of operational amplifier 52. The most negative voltage level appearing at detector output 13 is detected, and held by capacitor 55. Positive pulses appearing at detector output 13 are ignored as a result of diode 53 becoming non-conductive. Thus, pulse 9 is effectively removed from signal 13, leaving voltage baseline level 10. The values of resistor 54 and capacitor 55 control the attack time of the peak detector. The decay time (negative peak hold time) is controlled by the leakage from capacitor 55 through output 10, which is caused by the 10 ·a constant current provided by generator 22 (FIG. 6).

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A dust monitoring and adjustment method for a pharmaceutical counting and dispensing system, comprising the steps of:

a) generating a counting cell signal that deteriorates in relation to an amount of dust that accumulates upon said counting cell with respect to time; and b) adjusting the signal generated by said counting cell of step (a) in relation to said dust accumulation, by establishing a floating base line for counting cell operation and generating a counting signal with respect to said floating base line such that said counting cell functions accurately over a longer interval without requiring maintenance.

2. The dust monitoring and adjustment method in accordance with claim 1, wherein said adjusting step (b) further comprises,the step of:

c) changing a light level provided to said counting cell relative to said dust accumulation.

3. The dust monitoring and adjustment method in accordance with claim 1, wherein said generating step (d) further comprises the steps of:

e) establishing a higher, second floating base line for said counting cell; and f) generating a warning signal with respect to said higher, second floating base line.

4. The dust monitoring and adjustment method in accordance with claim 3, further comprising the step of:
   g) comparing said higher, second floating base line signal with a pill detection signal to generate an error signal.

5. The dust monitoring and adjustment method in accordance with claim 1, further comprising the step of:
   e) comparing said floating base line signal with a photocell light reduction signal to generate a tablet detected signal.

6. The dust monitoring and adjustment method in accordance with claim 1, wherein said generating step (d) further comprises the steps of:
   e) establishing a lower, second floating base line for said counting cell; and
   f) generating a warning signal with respect to said lower, second floating base line.

7. The dust monitoring and adjustment method in accordance with claim 6, further comprising the step of:
   g) comparing said lower, second floating base line signal with a pill detection signal to generate an error signal.

8. A dust monitoring and adjustment circuit for a pill, capsule, and tablet counting and dispensing system, comprising:
   a source of light;
   photo-detection means adjacent said source of light for detecting a pill, capsule, or tablet passing said source of light, and generating a detection signal, said photo-detection means comprising means for establishing a floating base line and generating said detection signal with respect thereto; and
   automatic light level control means operatively connected to said source of light and to said photo-detection means for adjusting said light with respect to the accumulation of dust in said pill, capsule, and tablet counting and dispensing system.

9. A dust monitoring and adjustment circuit for a pill, capsule, and tablet counting and dispensing system, comprising:
   a source of light;
   photo-detection means adjacent said source of light for detecting a pill, capsule, or tablet passing said source of light, and generating a detection signal;
   automatic light level control means operatively connected to said source of light and to said photo-detection means for generating a floating signal level with respect to said detection signal; and
   comparator means for comparing said detection signal with respect to said floating signal level, in order to adjust to the accumulation of dust in said pill, capsule, and tablet counting and dispensing system.

10. The dust monitoring and adjustment circuit in accordance with claim 9, wherein said automatic light level control means further comprises means for generating a higher floating signal level, and an error comparator means for comparing said higher floating signal level with said detection signal in order to generate a warning signal to indicate that said pill, capsule, and tablet counting and dispensing system requires cleaning.

11. The dust monitoring and adjustment circuit in accordance with claim 9, wherein said automatic light level control means further comprises means for generating a lower floating signal level, and an error comparator means for comparing said lower floating signal level with said detection signal in order to generate a warning signal to indicate that said pill, capsule, and tablet counting and dispensing system requires cleaning.

* * * * *